(12) United States Patent
Krishnan et al.

(10) Patent No.: US 8,069,181 B1
(45) Date of Patent: Nov. 29, 2011

(54) AUTODISCOVERY OF BUSINESS SERVICES

(75) Inventors: Gopal Krishnan, Austin, TX (US);
Chaitanya Laxminarayan, Austin, TX (US); Matthew Sanchez, Round Rock, TX (US); Manoj Saxena, Austin, TX (US); Joel Trunick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 11/455,957

(22) Filed: Jun. 20, 2006

Related U.S. Application Data

(60) Provisional application No. 60/792,757, filed on Apr. 18, 2006.

(51) Int. Cl.
*G06F 7/00* (2006.01)

(52) U.S. Cl. .......... 707/769; 709/203; 709/246

(58) Field of Classification Search .......... None
See application file for complete search history.

(56) References Cited

U.S. PATENT DOCUMENTS

| | | | | |
|---|---|---|---|---|
| 6,385,589 | B1 * | 5/2002 | Trusheim et al. | 705/2 |
| 6,643,652 | B2 * | 11/2003 | Helgeson et al. | 707/10 |
| 2004/0068586 | A1 * | 4/2004 | Xie et al. | 709/246 |
| 2004/0117199 | A1 * | 6/2004 | Fremantle et al. | 705/1 |
| 2004/0177335 | A1 * | 9/2004 | Beisiegel et al. | 717/102 |
| 2005/0050228 | A1 * | 3/2005 | Perham et al. | 709/246 |
| 2006/0174016 | A1 * | 8/2006 | Critchley et al. | 709/228 |
| 2007/0061487 | A1 * | 3/2007 | Moore et al. | 709/246 |
| 2007/0124541 | A1 * | 5/2007 | Lang et al. | 711/137 |

OTHER PUBLICATIONS

"Web Services Inspection Language (WS Inspection) 1.0", Keith Ballinger, Peter Brittenham, Ashok Malhotra, William A. Nagy and Stefan Pharies, Nov. 2001, Found in "http://www.ibm.com/developerworks/library/specification/ws-wsilspec/".*
"An Introduction to WSIL", Timothy Appnel, Oct. 16, 2002. Found in http://www.onjava.com/pub/a/onjava/2002/10/16/wsil.html.*
"Registering and Discovering RSS Feeds in UDDI", Karsten Januszewski, Microsoft, Dec. 9, 2002.*
"Registering and Discovering RSS Feeds in UDDI", Karsten Januszewski, Microsoft, Dec. 9, 2002.*
"Registering and Discovering RSS Feeds in UDDI", Karsten Januszewski, Microsoft, Dec. 9, 2002.*

* cited by examiner

*Primary Examiner* — Tim T Vo
*Assistant Examiner* — Hasanul Mobin
(74) *Attorney, Agent, or Firm* — Stevens & Showalter LLP

(57) ABSTRACT

An autodiscovery feature with an easy-to-use interface is provided to automatically collect metadata about electronic services for use within a business enterprise and to store that metadata in a metadata repository. The autodiscovery feature is used to create autodiscovery queries that are sent to electronic services to collect from the services' digests specified metadata useful for identifying the functionality of those services and integrating the services into business processes. Digests, such as RSS feeds and Atom feeds, are typically created by services to include useful metadata, such as the title of a service, the URL link to a description of the service, a brief description of the service, the publication date of the service, and other data. Autodiscovery queries can thus collect services' relevant metadata and store it in a business enterprise's metadata repository, so that the services' functionality can be quickly identified and used for business processes.

19 Claims, 4 Drawing Sheets

AUTODISCOVERY OF BUSINESS SERVICES

This application claims the benefit of U.S. Provisional Patent Application Ser. No. 60/792,757, filed Apr. 18, 2006 by the present inventors.

FIELD OF THE INVENTION

This innovation relates to electronic services, and, more particularly, to automated methods for populating business service registries with metadata about those services.

BACKGROUND OF THE INVENTION

Software Services

The promise of the Internet is an open e-business platform where companies can do business spontaneously with anyone, anywhere, and anytime without requiring that companies abandon their existing software applications and infrastructures. Increasingly companies rely on the Internet to obtain loosely coupled services deployed by service providers on application-based servers, which are computers on networks that mange the networks. A service is a discrete piece of logic with a defined set of capabilities for input and output. The following are examples of services:
  Java programs,
  Portlets, and
  Web services.

Web services are business-enterprise computer applications that can be utilized singly or collectively to accomplish a wide range of intended purposes, such as determining health-care patients' eligibility for benefits, submitting health-care claims, and providing stock quotes.

Services help companies dramatically cut costs, increase revenues, and improve competitive agility by combining existing, heterogeneous systems into cross-functional, multi-company applications. For example, Web services designed for insurance companies help them rapidly automate their business processes, eliminating paper and manual touches and saving them tens of millions of dollars annually. To supply such valuable and widely needed services, services providers may offer multiple services to client businesses.

Because services can operate independently of a particular computer language, platform, or location, a client business and a service may each use different computer languages, platforms, and locations in widely distributed systems over one or more networks. Open service standards have been developed for compatibility among service applications.

Service Applications

Service applications are computer applications that use services singly or collectively to accomplish intended purposes. To work with a specific services application, a service needs to accept business documents, process them, and pass them on in ways compatible with the service application. For example, service applications may comprise Web service applications that use Web services. A Web service application typically consists of one or more Web services, a document that describes how those Web services are to be used, portal Web pages, and UDDI entries. A Web service end point is the physical location of the Web service on a server and implements the Web service interface.

Example of Web Services Used by a Web Service Application

FIG. 1 shows an example of how multiple Web services are typically used as part of a Web service application for the filing and payment of medical insurance claims. Chained Web services are loosely connected Web services that may reside on different servers and that may be provided by separate businesses. A service provider employs a server 100 running a portal Web page 200 and Web service application 1 300.

A portal Web page 200 is a Web site interface that a person can reach over the Internet. Web site interfaces are computer-programmed modules that allow end-users to select variables and parameters from easy-to-use visual displays or to type in this input, save the information through selecting a save option, and have their selections automatically applied by computer subsequently, without those users having to program the information manually.

In this example, an attendant at a clinic computer 150 can use the Internet, through a wired link 144, a telephone network 130, and another wired link 142, to reach the portal Web page 200 on the Web service provider server 100. The attendant can then use the portal Web page 200 to fill out a claim file form 220 for one of the clinic's patients and submit it to Web service application 1 300.

Other means for submitting claims also exist. For example, an attendant at a clinic computer 150 might use link 144, network 130, and link 142 for a machine-to-machine transmission of a claim file directly to Web service application 1 300. Many kinds of wired and unwired links and networks could be used for this machine-to-machine transmission, such as the Internet, a private LAN (Local Area Network), a wireless network, a TCP/IP (Transmission Control Protocol/Internet Protocol) network, or other communications system.

To continue with the example, Web service application 1 300 receives each claim file through service 1 410, which relays the data over link 142, network 139, and link 143 to server 2 182. If necessary, Web service 2 420 transforms the format of the claim file to a format that Web service application 1 300 can use for its full operations. For example, a claim file might have been sent in NSF (National Standard Format) format, but Web service application 1 300 might require HIPAA (Health Insurance Portability and Accountability Act) format.

After the claim file is transformed to the correct message format, Web service 2 420 relays the data back over link 143, network 139, and link 145 to Web service 3 430, which is used to validate the claim file. In turn, Web service 3 430 relays the data back over link 145, network 139, and link 147 to Web service 4 440, which is used to send the claim file back over link 147, network 130, and link 148 to an insurance company server 170 for payment to the clinic.

Problems with Integrating Virtualized Resources

To integrate the virtualized resources required for its operations, a business enterprise may use a metadata repository that contains metadata about those services. Virtualized resources refer to business services, Web services, Web-service applications, and groupings of Web-service applications as suites. For example, a business enterprise may use a standard UDDI registry or a proprietary metadata registry for this purpose.

A metadata repository is a flexible classification system for advertising the functionality of individual business services and metadata about their requirements for interoperability with other services within that business enterprise. For example, the required metadata may be
  The title of a service,
  The URL link to a description of the service,
  The organization hierarchy of the service within that business enterprise, and
  The user level of the service within that business enterprise, for example governing access for security control.

The services within a business enterprise may have multiple existing software assets that may be needed for use within the business enterprise. Moreover, these assets can exist in different sources or locations, such as the following:

Source repositories.
UDDI registries,
Access databases,
Excel sheets, and
File systems.

Source can comprise anything that publishes in a well known location a feed or digest about the service. Some examples of sources include application servers, mainframes, and hand-held devices.

For these resources to be available within the business enterprise, the enterprise's metadata repository must be populated with the required metadata about them that will permit their use. However, the programmers who create the services and their assets typically do not populate a business enterprise's metadata repository with the required metadata about those services and assets.

Prior Solutions

Manual Discovery and Populating

In one prior solution, other parties than the creators of the services manually find those services and enter information the required metadata about those services into a business enterprise's metadata repository. However, this manual solution is laborious, time-consuming, and prone to errors.

Crawler Programs

In another prior solution, programmers create crawler programs that search the Internet for services required for a business enterprise. These crawlers typically search descriptive information, such as WSIL (Web Services Inspection Language) information, associated with services' HTML (HyperText Markup Language) pages. WSIL is a XML-based standard for Web services discovery documents that lists groups of web services and their URL endpoints in repositories such as UDDI registries. However, it is difficult for programmers to know where to start and how to narrow their searches, given the vast amount of information about services that is available on the Internet. Moreover, many businesses do not supply the required information in their HTML pages or do not supply it a format that can easily be used.

Therefore there is a need for a system and method that provides a more effective automated way to populate metadata about services into a business enterprise's metadata repository.

BRIEF SUMMARY OF THE INVENTION

These and other needs are addressed by the present invention. The following explanation describes the present invention by way of example and not by way of limitation.

It is an aspect of the present invention to provide an automatic system and method for populating a metadata repository with metadata to identify the functionality of electronic services and integrate those services into business processes.

It is another aspect of the present invention to provide an AD (autodiscovery) feature with an easy-to-use interface for creating AD queries to automatically collect useful metadata from electronic services' digests, such as RSS feeds and Atom feeds.

It is still another aspect of the present invention to provide an AD (autodiscovery) feature with an easy-to-use interface for creating AD queries to automatically store in a metadata repository useful metadata collected from electronic services digests, such as RSS feeds and Atom feeds.

These and other aspects, features, and advantages are achieved according to the system and method of the present invention. In accordance with the present invention, an autodiscovery feature with an easy-to-use interface is provided to automatically collect metadata about electronic services for use within a business enterprise and to store that metadata in a metadata repository. The autodiscovery feature is used to create autodiscovery queries that are sent to electronic services to collect from the services' digests specified metadata useful for identifying the functionality of those services and integrating the services into business processes. Digests, such as RSS feeds and Atom feeds, are typically created by services to include useful metadata, such as the title of a service, the URL link to a description of the service, a brief description of the service, the publication date of the service, and other data. Autodiscovery queries can thus collect services' relevant metadata and store it in a business enterprise's metadata repository, so that the services' functionality can be quickly identified and used for business processes.

BRIEF DESCRIPTION OF THE DRAWINGS

The following embodiment of the present invention is described by way of example only, with reference to the accompanying drawings, in which.

DETAILED DESCRIPTION

The details of the following explanation are offered to illustrate the present invention clearly. However, it will be apparent to those skilled in the art that the concepts of present invention are not limited to these specific details. Commonly known elements are also shown in block diagrams for clarity, as examples and not as limitations of the present invention.

Operating Environment

Figure 1:
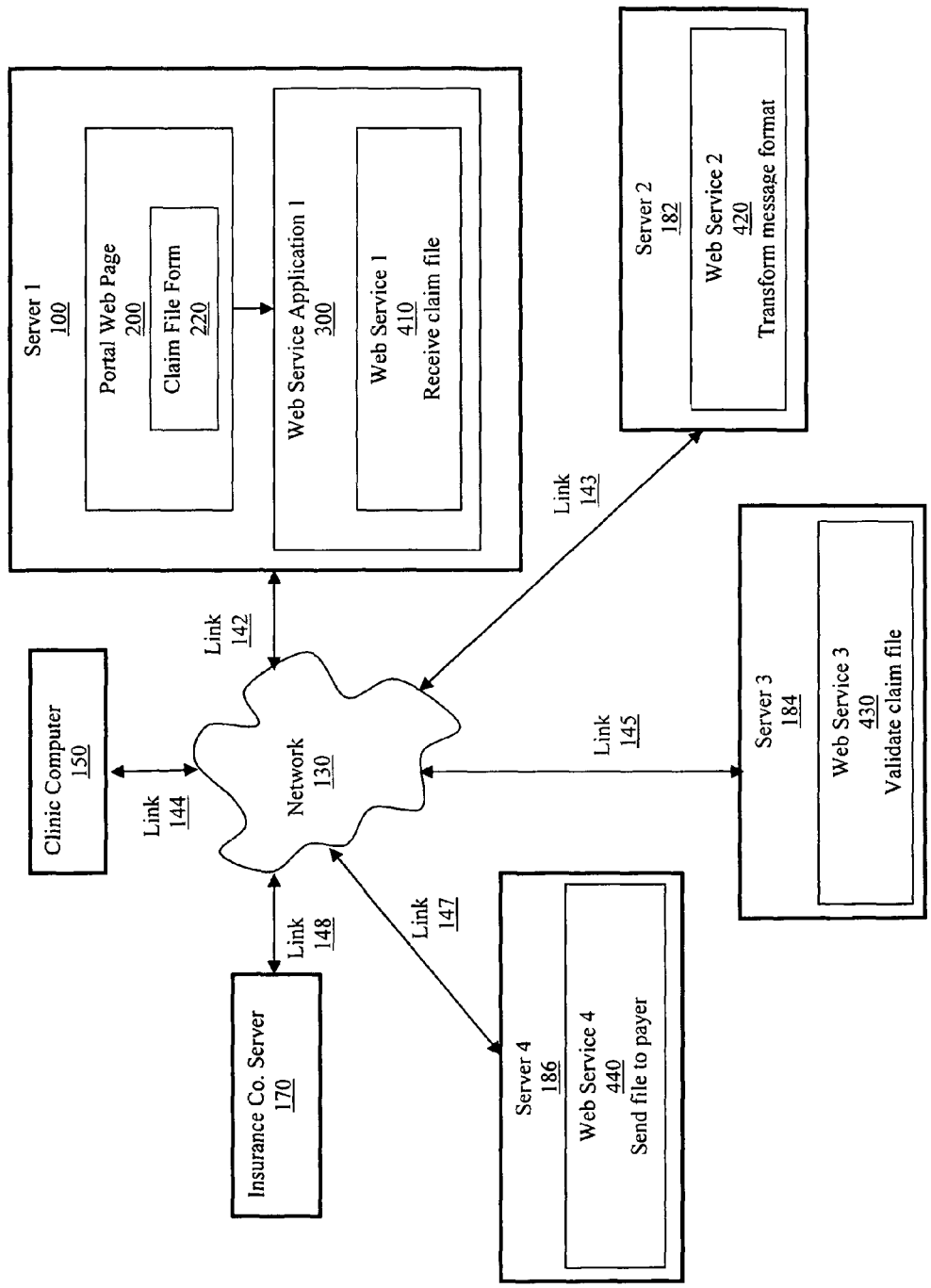
FIG. 1 is a block diagram showing an example of loosely connected services used by a service application for filing patient claims.
Figure 2:
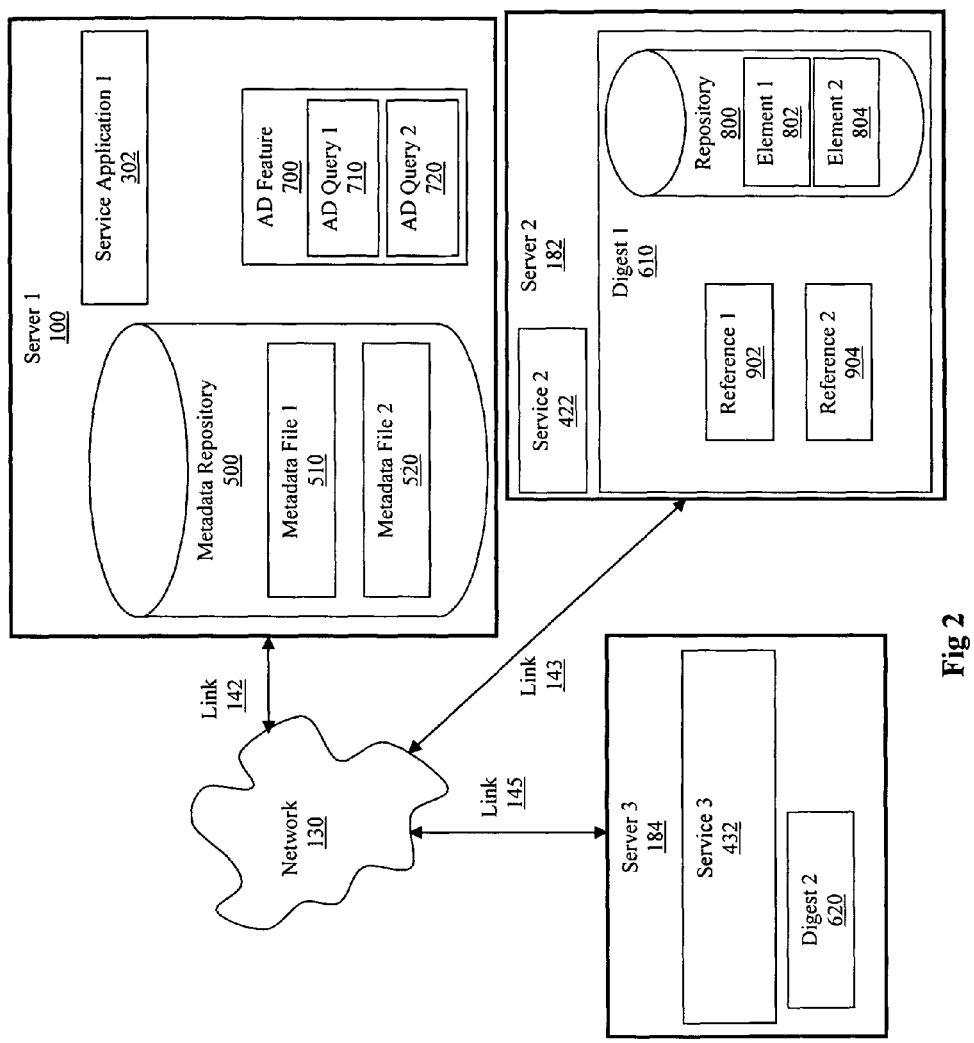
FIG. 2 is a block diagram showing an operating environment in which embodiments of the present invention may be employed.

An embodiment of an operating environment of the present invention is shown in FIG. 2. A party employs server 1 100 to automate the process of finding services useful to a business enterprise and populating metadata about those services in the business enterprise's metadata repository 500.

Server 1 100 can communicate with other servers, such as server 2 182 and server 3 184, through a wired or wireless network 130 and wired or wireless links 142, 143, and 145.

The servers 100, 182, and 184 may be personal computers or larger computerized systems. The network 130 may be the Internet, a private LAN (Local Area Network), a wireless network, a TCP/IP (Transmission Control Protocol/Internet Protocol) network, or other communications system, and may comprise multiple elements such as gateways, routers, and switches. The links 142, 143, and 145 are compatible with the technology used for network 130.

Server 2 182 can provide a service, such as service 2 422, that is useful for a business enterprise using a service application 1 302 at server 1 100. In the same way, server 3 184 can provide another useful service, such as service 3 432.

On server 1 100, a party further sets up metadata repository 500. Metadata repository 500 is an electronic storage area that can store files, such as metadata file 1 510 and metadata file 2 520, containing metadata information about electronic services, such as service 2 422 and service 3 432.

Also on server 1 100, an AD (autodiscovery) feature 700 is set up to create AD (autodiscovery) queries, such as AD query 1 710 and AD query 2 720, as explained below.

In other embodiments, the elements given above may be more widely dispersed on different servers or used independently of server 1 100. For example, metadata repository 500 and AD feature 700 could be set up on different servers from server 1 100.

Moreover, multiple metadata repositories could be set up for different business enterprises on server 1 100 or on multiple servers.

Process of Autodiscovery

Figure 3:
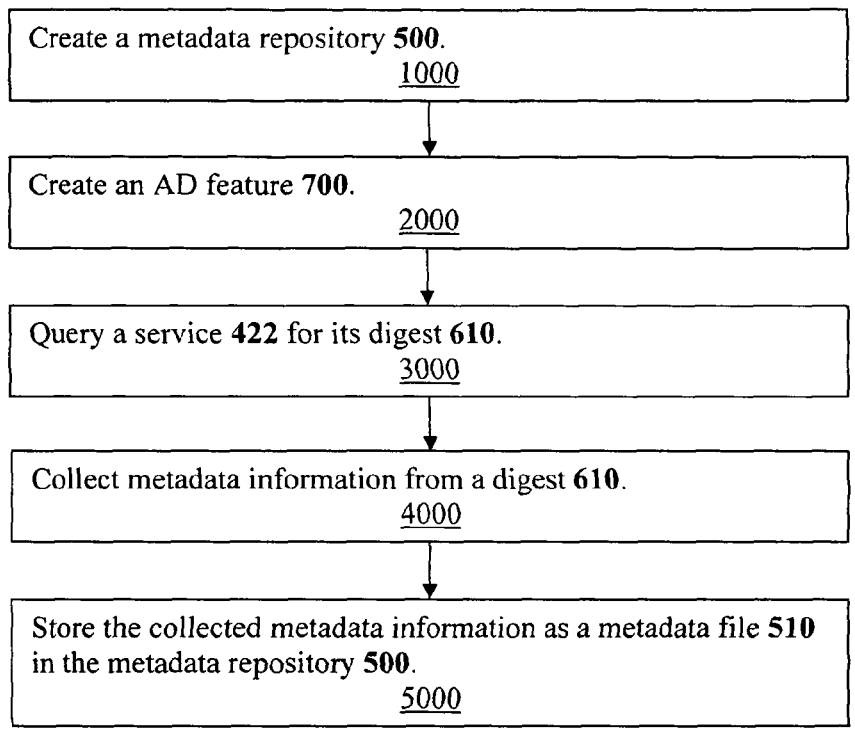
FIG. 3 is top-level, flow chart that illustrates a process automatically collecting metadata about electronic services from the services' digests and storing that data in a metadata repository.

FIG. 3 is top-level flow chart that illustrates a process for ensuring the interoperability of services for use in specific areas through the operating environment shown in FIG. 2.

Step 1000 in FIG. 3. Create a metadata repository 500.

On server 1 100, shown in FIG. 2, one or more programmers create a non-volatile data storage area 500 capable of storing files containing metadata about electronic services.

Step 2000 in FIG. 3. Create an AD feature 700.

On server 100, shown in FIG. 2, one or more programmers create an AD feature 700, which is an application with an easy-to use interface for creating AD queries that collect metadata about assets from electronic services and store that metadata in a metadata repository 500.

Example of an AD Feature

The following code illustrates an embodiment of the syntax for an AD query that is created by the AD feature 700, shown in FIG. 2.

```
feed<-read feed using url
for each item in feed do
   if (item is desired) do
      import item using item link and type (ie. wsdl/bpel)
      save metadata in metadata repository
   end do
end for
```

These lines represent syntax used to find a site using a URL, obtain relevant metadata from a digest 610, and store that metadata as a metadata file 510 in a metadata repository 500.

In an embodiment, for example, the AD feature 700 could specify that the following relevant metadata be obtained from the digest 610:

The title of a service;
The URL link to a description of the service;
A description that briefly describes the service;
The publication date of the service; and
The type (format) of the metadata.

Step 3000 in FIG. 3. Query a service 422 for its digest 610.

One or more programmers create an AD query 710, shown in FIG. 2, to collect metadata from the digest 610 of a service 422.

Digests

Digests are well defined locations created by businesses for metadata. Digests represent syndication formats for content and are useful for presenting the information required to enable the sharing of content among different services or sites, including metadata about the content, in feeds. Feeds are documents, typically XML-based, that deliver structured content. RSS (really simple syndication) and Atom are useful examples of XML (Extensible Markup Language) syndication formats for feeds.

As shown in FIG. 2, a digest 610 can contain references 902 and 904 to a large number of metadata elements 802 and 804 stored in a repository 800. For example, reference 1 902 could show the link to element 1 802, and reference 2 904 could show a different link to element 2 804. Some examples of these metadata elements are The title of a service;
The URL link to a description of the service;
A description that briefly describes the service;
The publication date of the service; and
The type (format) of the metadata.

For example, common types are

WSDL (Web Services Description Language) information showing the type of link. WSDL is an XML (Extensible Markup Language)-formatted language for describing Web services as collections of end points.

BPEL information (Business Process Execution Language). BPEL is a business process language that enables programming in the large, referring to the high-level state transition interactions of a business process.

OWL (Web Ontology Language) information. OWL is a markup language for publishing data using ontologies on the Internet.

Other services, such as service 3 432, may also have digests, such as digest 2 620, that provide metadata about their services.

Example of a Digest

The following example of a business's digest, an RSS feed, shows that the business offers several services:

Stock quote information, and
Inventory information of books by ISBN (International Standard Book Number).

For these services, the RSS feed provides

The title,
The URL link to further information about the service,
A brief description of the information provided,
The publication date.

```
<?xml version="1.0" encoding="UTF-8" ?>.
<rss version="0.94">
<channel>
<title>WSF UDDI WSDL Digest</title>
<link>http://LinkToThisFeed/</link>
<item>
<title>Stock Quotes (wsdl)</title>
<link>http://www.oursite.com/StockQuote.wsdl</link>
<description type="text/plain">This service provides stock quote information.</description>
<pubDate>Thu, 23 Feb 2006 17:00:34 GMT</pubDate>
</item>
<item>
<title>Book Library (wsdl)</title>
<link>http://www.oursite.com/Library.wsdl</link>
<description type="text/plain">This service provides inventory information of books by ISBN.</description>
<pubDate>Thu, 23 Feb 2006 17:00:34 GMT</pubDate>
</item>
</channel>
</rss>
```

Example of an AD Query

In an embodiment, the format for an AD query 710, shown in FIG. 2, created through the autodiscovery feature 700 to collect RSS feed UDDI metadata from a service 422 is

```
Feed URL: [http://www.mycompany.com/engineering/
    uddi.rss]
feed<-read feed using url
for each item in feed do
    if (item is desired) do
        import item using item link and type (ie. wsdl/bpel)
        save metadata in metadata repository
    end do
end for
```

The first line in this example, which would typically be entered manually, provides a feed URL to a target site. The remaining lines represent the syntax applied by the AD feature 700 to find the site, obtain relevant metadata from the digest 610, and store that metadata as a metadata file 510 in a metadata repository 500.

Step 4000 in FIG. 3. Collect metadata information from a digest 610.

The AD query 710, shown in FIG. 2, does a bulk import of relevant metadata from a digest 610.

Step 5000 in FIG. 3. Store the collected metadata information as a metadata file 510.

The AD query 710, shown in FIG. 2, then stores the metadata as a metadata file 510 in the metadata repository 500.

Advantages of Autodiscovery

The autodiscovery feature 700, shown in FIG. 2, provides automated syntax for a direct route to the metadata needed to populate metadata repositories. Digests, such as RSS feeds and Atom feeds, are well defined locations that provide the required metadata about services and their assets for use within a business enterprise. The autodiscovery feature 700 is thus more automated, more comprehensive, and faster than prior methods of populating a metadata repository.

The autodiscovery feature 700 may be particularly useful for information-intensive industries that employ multiple services, such as the health care insurance, casualty insurance, banking, and telecommunications industries.

Computer System Overview

Figure 4:
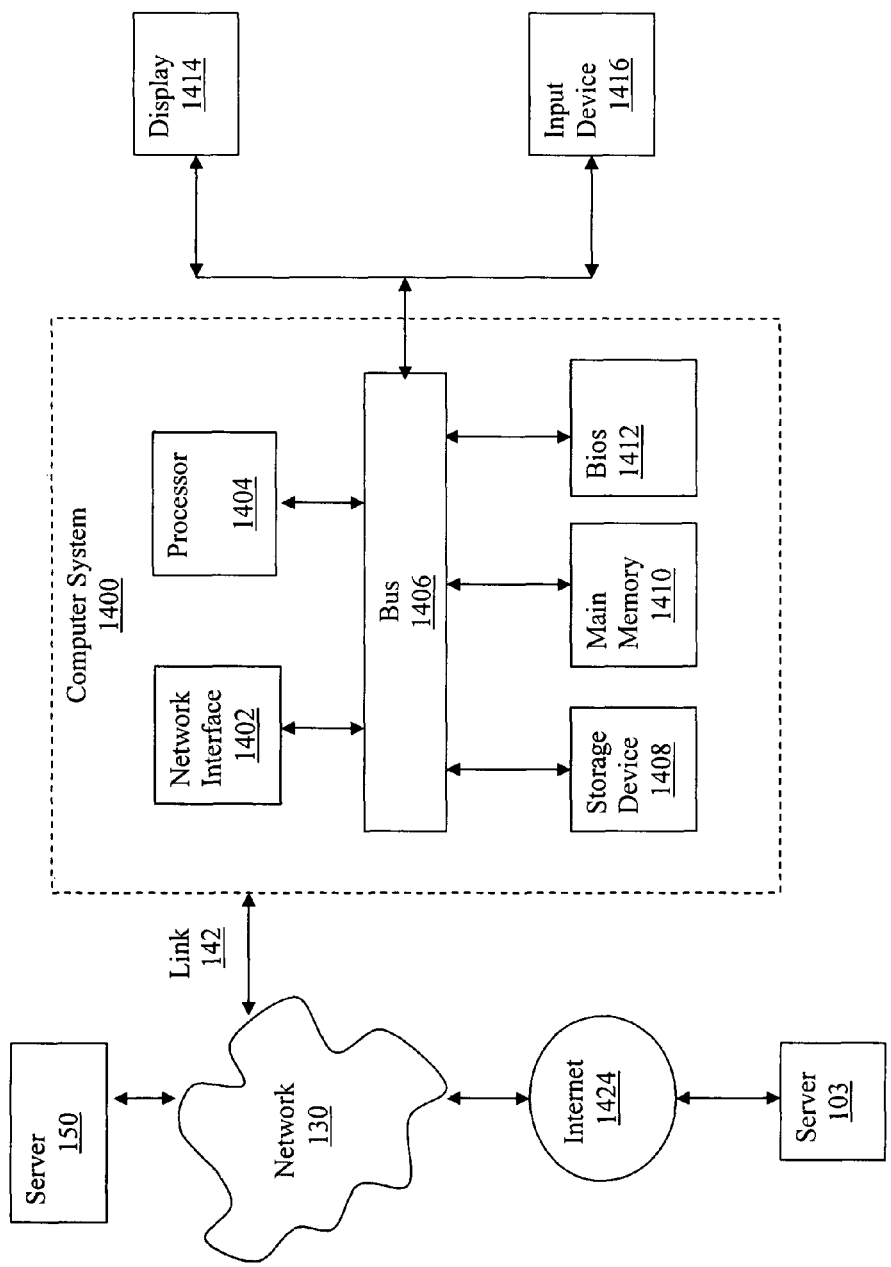
FIG. 4 is a block diagram that illustrates a typical computer system, representing a provider server on which embodiments of the present invention can be implemented.

FIG. 4 is a block diagram that illustrates an example of a typical computer system 1400, well known to those skilled in the art, representing a server 100 on which embodiments of the present invention can be implemented. This computer system 1400 comprises a network interface 1402 that provides two-way communications through a wired or wireless link 142 to a wired or wireless communications network 130 that uses any applicable communications technology. For example, the network 130 can comprise a public telephone network, a wireless network, a local area network (LAN), and any known or not-yet-know applicable communications technologies, using correspondingly applicable links. The network 130 in turn provides communications with one or more host computers 150 and, through the Internet 1424, with one or more servers 103.

The network interface 1402 is attached to a bus 1406 or other means of communicating information. Also attached to the bus 1406 are the following:
- a processor 1404 for processing information;
- a storage device 1408, such as an optical disc, a magneto-optical disc, or a magnet disc, for storing information and instructions;
- main memory 1410, which is a dynamic storage device such as a random access memory (RAM) that stores information and instructions to be carried out by processor 1404;
- a bios 1412 or another form of static memory such as read only memory (ROM), for storing static information and instructions to be carried out by processor 1404;
- a display 1414, such as a liquid crystal display (LDC) or cathode ray tube (CRT) for displaying information to user of the computer system 1400; and
- an input device 1416, with numeric and alphanumeric keys for communicating information and commands to processor 1404. In another embodiment a mouse or other input devices can also be used.

The computer system 1400 is used to implement the methods of the present invention in one embodiment. However, embodiments of the present invention are not limited to specific software and hardware configurations. Computer system 1400 can receive data comprising client application messages from computer 150 and server 103 used by client business, through a network 130 such as the Internet, appropriate links 142, such as wired or wireless ones, and its network interface 1402. It can of course transmit data back to client business application over the same routes.

Computer system 1400 carries out the methods of the present invention when its processor 1404 processes instructions contained in its main memory 1410. Another computer-readable medium, such as its storage device 1408, may read these instructions into main memory 1410 and may do so after receiving these instructions through network interface 1402. Processor 1404 further processes data according to instructions contained in its storage device 1408. Data is relayed to appropriate elements in computer system 1400 through its bus 1406. Instructions for computer system 1400 can also be given through its input device 1416 and display 1414.

"Computer-readable medium" refers to any medium that provides instructions to processor 1404, comprising volatile and/or non-volatile media. Volatile media comprise dynamic memory, such as main memory 1410. Non-volatile media comprise magnetic, magneto-optical, and optical discs, such as storage device 1408. Typical examples of widely used computer-readable media are floppy discs, hard discs, magnetic tape, CD-ROMs, punch cards, RAM, EPROMs, FLASH-EPROMs, memory cards, chips, and cartridges. Multiple computer-readable media may be used, known and not yet known, can be used, individually and in combinations, in different embodiments of the present invention.

It will also be apparent to those skilled in the art that different embodiments of the present invention may employ a wide range of possible hardware and of software techniques. For example the communication between a service provider and client business computers could take place through any number of links, including wired, wireless, infrared, or radio ones, and through other communication networks beside those cited, including any not yet in existence.

Also, the term computer is used here in its broadest sense to include personal computers, laptops, telephones with computer capabilities, personal data assistants (PDAs) and servers, and it should be recognized that it could include multiple servers, with storage and software functions divided among the servers. A wide array of operating systems, compatible e-mail services, Web browsers and other communications systems can be used to transmit messages among client applications and services.

Furthermore, in the previous description the order of processes, their numbered sequences, and their labels are presented for clarity of illustration and not as limitations on the present invention.

What is claimed is:

1. A method to integrate services into business processes comprising:
    providing a user interface for use by a user to create autodiscovery queries, which, when executed on a computer, automatically collect metadata about corresponding electronic services and store query results in a metadata storage, wherein:

the metadata storage is accessible by a first server computer and stores files containing metadata about queried electronic services hosted by one or more remote servers including requirements of the electronic services for interoperability with other services; and whereupon execution, each created autodiscovery query implemented within the user interface obtains metadata about a corresponding service by:

obtaining a manually entered feed uniform resource locator to a target site associated with the corresponding service; and querying the corresponding service using the obtained feed uniform resource locator to collect digest feed metadata from a digest of the corresponding service, the digest comprising at least one syndication format for content and information required to enable sharing of content among different services or sites;

programmably reading a digest feed of the digest using the obtained feed uniform resource locator;

automatically obtaining only metadata items that were previously determined to be relevant to enable sharing of content among the different services or sites from the digest; and storing the collected metadata information in the metadata storage.

2. The method of claim 1 wherein automatically obtaining only metadata items that were previously determined to be relevant to enable sharing of content comprises collecting metadata information regarding at least one of:

the title of the service;
a URL link to a description of the service;
the organization hierarchy of the service; and
the user level of the service.

3. The method of claim 1 wherein storing the collected metadata information in the metadata storage further comprises storing the metadata information as a metadata file in a metadata repository.

4. The method of claim 1 wherein querying the corresponding service comprises querying at least one service that is implemented as multiple software assets.

5. The method of claim 4 wherein the multiple software assets exists in multiple locations comprising at least one of source repositories, UDDI registries, Access™ databases, Excel™ sheets, file systems, application servers, mainframes, and handheld devices.

6. The method of claim 1 wherein automatically obtaining only metadata items that were previously determined to be relevant to enable sharing of content comprises obtaining a plurality of references such that each reference is a link to a metadata element.

7. The method of claim 6 wherein obtaining a plurality of references such that each reference is a link to a metadata element comprises obtaining metadata elements including at least one of:

the title of the service;
the URL link to a description of the service;
a description that briefly describes the service;
a publication date of the service; and
a format of the metadata.

8. The method of claim 7 wherein obtaining metadata elements further comprises obtaining metadata elements where the format of the metadata is selected from the group consisting of Web Services Description Language, Business Process Execution Language, and Web Ontology Language.

9. The method of claim 1 wherein querying the corresponding service further comprises querying the selected service for a feed with a format of RSS feeds or Atom feeds.

10. The method of claim 1 wherein querying the corresponding service comprises querying at least one service that is implemented as at least one of:

a health care insurance business process, a casualty insurance business process, a banking business process, and a telecommunications industry business process.

11. The method of claim 10 wherein querying at least one service comprises querying a service that transforms the format of a claim file.

12. A computer program product to integrate services into business processes comprising:

a computer-readable storage medium for storing instructions defining computer usable program code embodied therewith, the computer usable program code comprising:

computer usable program code configured to implement a user interface for use by a user to create autodiscovery queries, which, when executed on a computer, automatically collect metadata about corresponding electronic services and store query results in a metadata storage, computer usable program code configured to interact with the metadata storage where the metadata storage is provided to store files, accessible by a first server computer, where the files contain metadata about electronic services hosted by one or more remote servers including requirements of the electronic services for interoperability with other services; and computer usable program code configured execute each created autodiscovery query implemented within the user interface to obtain metadata about a corresponding service by:

obtaining a manually entered feed uniform resource locator to a target site associated with the corresponding service; and querying the corresponding service using the obtained feed uniform resource locator to collect digest feed metadata from a digest of the corresponding service, the digest comprising at least one syndication format for content and information required to enable sharing of content among different services or sites;

programmably reading a digest feed of the digest using the obtained feed uniform resource locator;

programmably obtaining only metadata items that were previously determined to be relevant to enable sharing of content among the different services or sites from the digest; and storing the collected metadata information in the metadata storage.

13. A system to integrate services into business processes comprising:

a first server computer; and a metadata storage accessible by the first server computer where the metadata storage is provided for storing files containing metadata about electronic services hosted by one or more remote servers including requirements of the electronic services for interoperability with other services;

a user interface for use by a user to create autodiscovery queries, which, when executed by the first server computer, automatically collect metadata about corresponding electronic services and store query results in the metadata storage;

whereupon execution, each created autodiscovery query implemented within the user interface obtains metadata about a corresponding service by performing operations configured to:

obtain a manually entered feed uniform resource locator to a target site associated with the corresponding service; and query the corresponding service using the obtained feed uniform resource locator to collect digest feed metadata from a digest of the corresponding service, the digest comprising at least one syndication format for content and information required to enable sharing of content among different services or sites;

programmably read a digest feed of the digest using the obtained feed uniform resource locator;

programmably obtain only metadata items that were previously determined to be relevant to enable sharing of content among different services or sites from the digest; and store the collected metadata information in the metadata storage;

wherein a selected server computer is used to:

recall metadata for a desired service from the metadata storage in response to implementing a business process;

use the recalled metadata to identify the functionality of the desired service; and integrate the desired service into the business process.

14. The method according to claim 1, further comprising:

recalling metadata for a desired service from the metadata storage in response to implementing a business process;

using the recalled metadata to identify the functionality of the desired service; and integrating the desired service into the business process.

15. The computer program product according to claim 12, further comprising:

computer usable program code configured to recall metadata for a desired service from the metadata storage in response to implementing a business process;

computer usable program code configured to use the recalled metadata to identify the functionality of the desired service; and computer usable program code configured to integrate the desired service into the business process.

16. The computer program product of claim 12, wherein querying the corresponding service further comprises querying the selected service for a feed with a format of RSS feeds or Atom feeds.

17. The system of claim 13, wherein the query of the corresponding service further comprises a query to the selected service for a feed with a format of RSS feeds or Atom feeds.

18. The computer program product of claim 12, wherein programmably obtaining only metadata items that were previously determined to be relevant further comprises obtaining metadata elements where the format of the metadata is selected from the group consisting of Web Services Description Language, Business Process Execution Language, and Web Ontology Language.

19. The system of claim 13, wherein execution of the autodiscovery query to obtain only metadata items that were previously determined to be relevant further comprises obtaining metadata elements where the format of the metadata is selected from the group consisting of Web Services Description Language, Business Process Execution Language, and Web Ontology Language.

* * * * *